United States Patent
Bianco et al.

(10) Patent No.: US 9,908,422 B2
(45) Date of Patent: Mar. 6, 2018

(54) SYSTEM FOR COILING ELECTRICAL CABLE FOR ELECTRIC VEHICLE CHARGING

(71) Applicant: Control Module, Inc., Enfield, CT (US)

(72) Inventors: James S. Bianco, Suffield, CT (US); John Fahy, Longmeadow, MA (US)

(73) Assignee: Control.Module, Inc., Enfield, CT (US)

( * ) Notice: Subject to any disclaimer, the term of this patent is extended or adjusted under 35 U.S.C. 154(b) by 85 days.

(21) Appl. No.: 14/915,717

(22) PCT Filed: Jul. 9, 2015

(86) PCT No.: PCT/US2015/039684
§ 371 (c)(1),
(2) Date: Mar. 1, 2016

(87) PCT Pub. No.: WO2016/007710
PCT Pub. Date: Jan. 14, 2016

(65) Prior Publication Data
US 2016/0207408 A1    Jul. 21, 2016

Related U.S. Application Data

(60) Provisional application No. 62/022,844, filed on Jul. 10, 2014.

(51) Int. Cl.
*B60L 11/18* (2006.01)
*B60L 3/00* (2006.01)
(Continued)

(52) U.S. Cl.
CPC ......... *B60L 11/1816* (2013.01); *B60L 3/0069* (2013.01); *B60L 3/04* (2013.01);
(Continued)

(58) Field of Classification Search
CPC .............. B60L 11/1816; B60L 11/1818; B60L 11/1824; B65H 75/48; B65H 75/4405; B65H 75/4486
See application file for complete search history.

(56) References Cited

U.S. PATENT DOCUMENTS

| 5,720,627 A | 2/1998 | Gillbrand et al. |
| 2012/0048983 A1 | 3/2012 | Bianco et al. |
| (Continued) | | |

FOREIGN PATENT DOCUMENTS

GB    1071784    6/1967

OTHER PUBLICATIONS

Search Report and Written Opinion.

*Primary Examiner* — Sang K Kim
(74) *Attorney, Agent, or Firm* — Alix, Yale & Ristas, LLP

(57) ABSTRACT

A system for coiling an electrical cable employed for charging an electric vehicle employs a cable management system. The cable management system has a drive assembly which has a drive mode that retracts the cable and release mode which allows for the cable to be extended. The installation employs a drum having a cylindrical sidewall. The drive assembly drives the cable downwardly into a drum so that the cable progressively engages the sidewall to form a vertical coiled configuration. A clutch assembly cooperates with the drive assembly to provide the automatic retracting and extending operations and also locks the vehicle connector at the end of the electrical cable in an extended position as well as a retracted home position.

21 Claims, 12 Drawing Sheets

(51) Int. Cl.
*B60L 3/04* (2006.01)
*B65H 75/44* (2006.01)
*B65H 75/48* (2006.01)

(52) U.S. Cl.
CPC ....... *B60L 11/1818* (2013.01); *B60L 11/1824* (2013.01); *B65H 75/4405* (2013.01); *B65H 75/4471* (2013.01); *B65H 75/4486* (2013.01); *B65H 75/48* (2013.01); *B60L 2230/12* (2013.01); *B60L 2230/16* (2013.01); *B60L 2240/36* (2013.01); *B65H 2701/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 2012/0326664 A1 | 12/2012 | Venegas, Jr. |
| 2014/0021915 A1 | 1/2014 | Staley et al. |
| 2014/0111158 A1 | 4/2014 | Kinomura et al. |

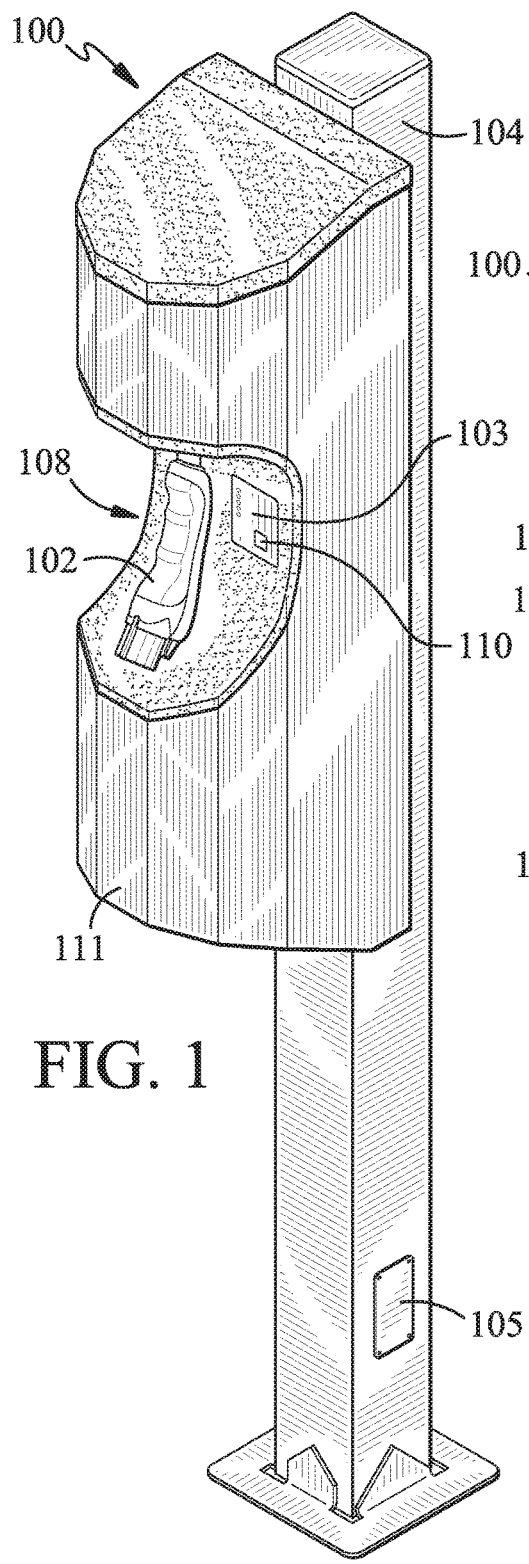
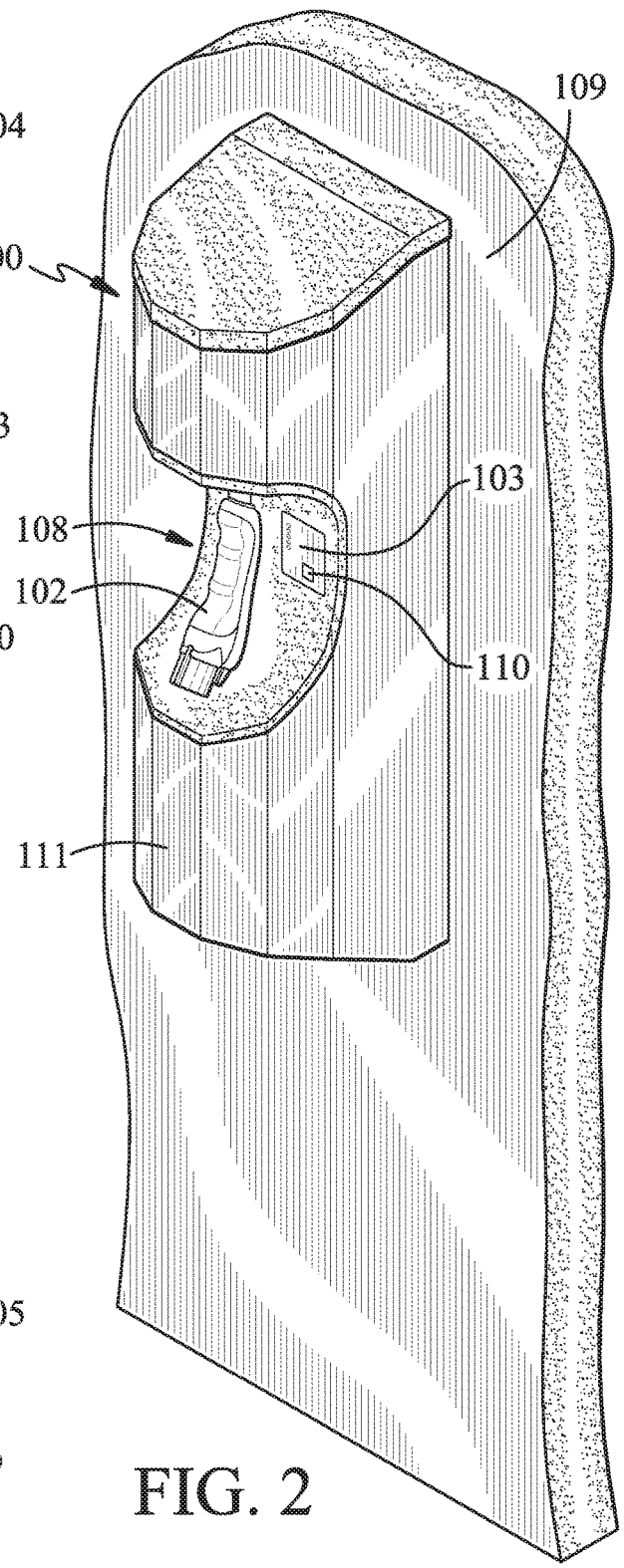
FIG. 1
FIG. 2

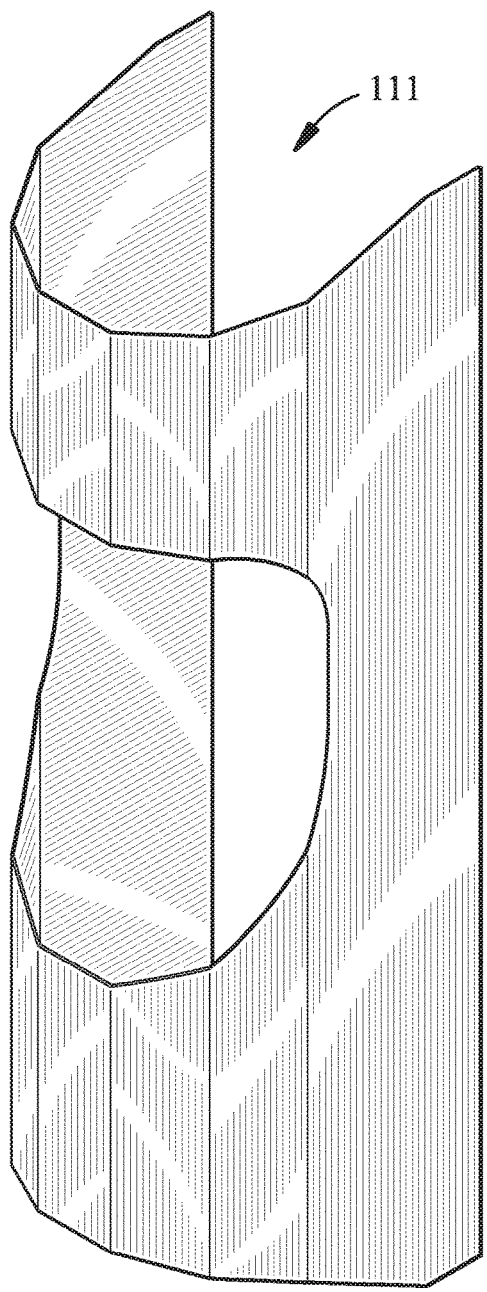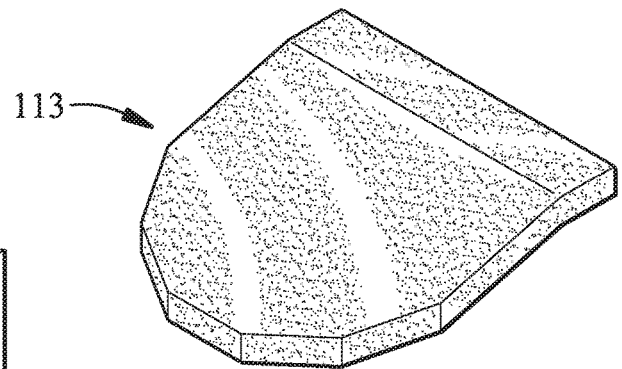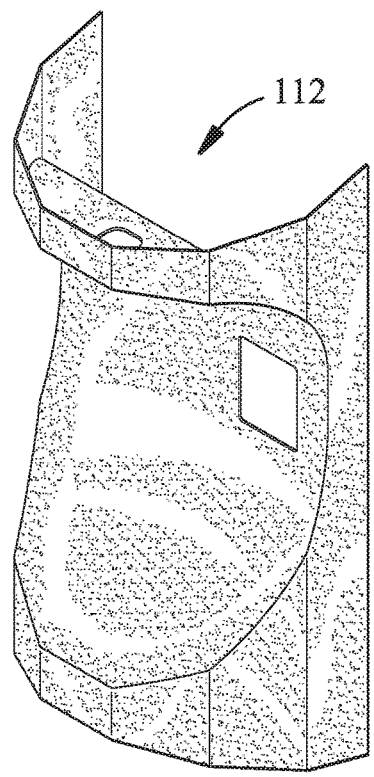
FIG. 3d
FIG. 3c
FIG. 3b

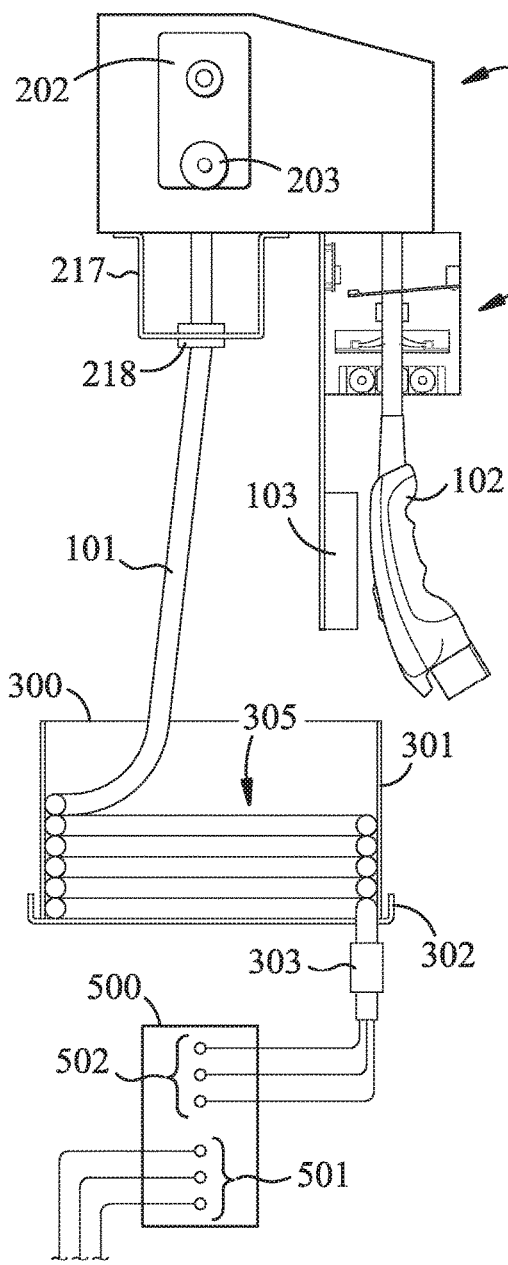
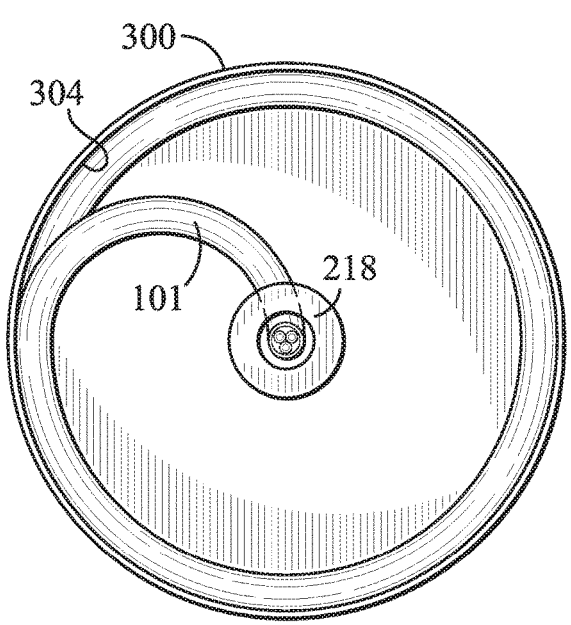
FIG. 6
FIG. 7

SYSTEM FOR COILING ELECTRICAL CABLE FOR ELECTRIC VEHICLE CHARGING

BACKGROUND

This disclosure relates generally to installations for charging the power supply of an electric vehicle. More particularly, this disclosure relates to charging stations which employ an electric cable having a connector for electrically connecting with the battery power charging unit of the electric vehicle (EV).

With the large number of electric vehicle chargers being deployed for public use, there has arisen a need to manage the electric cable that connects the electric vehicle to the electric vehicle supply or service equipment (EVSE). When the cable is not stored properly or left on the ground or pavement, it is exposed to the elements, such as rain, snow, ice and dirt. The cables left on the ground also become a tripping hazard.

Publicly accessible EVSE installations have become widespread and assume numerous configurations and capabilities. Commonly, publicly accessible EVSE is a post-mounted installation having a permanently attached electrical cable which may extend up to 25 feet in order to accommodate the connection to the electric vehicle. From a safety standpoint, it is exceedingly important that the cable cannot be excessively extended when not in use and that the electric cable not be allowed to lie on the pavement or adjacent area where it can be exposed to the elements, damaged, run-over or otherwise degraded.

Because the EVSE installations are now typically compact, providing for an efficient and effective extension of the cable and suitable retraction and/or limiting the extension of the cable has become problematic. Ideally, the cable should be retracted into a protective housing when not in use so that only the connector end of the cable is exposed for grasping by the user to connect to the EV for charging.

Naturally, it is highly desirable that any mechanism which allows the power cable to be extended and retracted must be reliable and efficient since the functionality of the EVSE is very dependent upon the connectivity to the electric vehicle and the integrity of the electrical connection.

SUMMARY

Briefly stated, in one embodiment, an EVSE installation comprises a drum having a cylindrical side wall with a generally vertical central axis and a top. An electrical cable with a vehicle connector at one end and connectable to a power supply at the other end is retractable and extendable into and from the drum. A cable management system comprises an automatic drive assembly for the electrical cable. The drive assembly has a drive mode to retract the cable and a release mode to extend the cable. The drive assembly drives the cable into the drum so that the cable progressively engages the sidewall to form a vertical coiled configuration and the cable and connector are disposed at a stable home position.

The drum is preferably supported on a pole or a wall. The cable management system comprises a clutch mechanism that remains locked when no power supplied. The EVSE installation further preferably comprises an enclosure for the drum. The enclosure has a front cover that mounts a control panel and receives the vehicle connector at the home position. The drive assembly comprises a motor and a drive gear rotatably connecting with a drive pulley. The cable management system also comprises a clutch mechanism controlled by a clutch solenoid. The clutch mechanism preferably further comprises a clutch gear, a clutch lever and a spring attached to the clutch lever. Upon de-energizing the clutch solenoid, the clutch gear engages the drive gear.

Upon sensing the connection of the vehicle connector to an electric vehicle, the solenoid and the motor are not energized and the drive pulley is thereby locked to prevent further extension of the cable. Upon energizing the solenoid, the lever pivots and the clutch gear separates from the drive gear so that the pulley drive gear is free to rotate and the cable is freely extendable. Upon disconnecting the vehicle connector from the electric vehicle, the cable is automatically retracted into the drum by the drive assembly.

The EVSE installation preferably comprises a sensor that senses the home position of the cable and the connector. The sensor is a magnetic sensor. The EVSE installation further has a centering guide ring through which the cable passes.

In one embodiment of an EVSE installation, the drum defines a generally cylindrical container with a centering guide ring. An electrical cable with a vehicle connector at one end and connectable to a power supply at the other end is retractable and extendable through the centering ring into and from the drum. The cable management system comprises a drive assembly for the electrical cable. The drive assembly has a drive mode to automatically retract the cable and a release mode to allow the cable to extend from the drum. The drive assembly automatically drives the cable into the drum so that the cable progressively engages the container to form a coiled configuration and continues until the cable and connector are disposed at a stable home position.

The cable management system includes a clutch mechanism and the drive assembly comprises a motor operatively engageable with the clutch mechanism. The clutch mechanism operatively engages with the motor to lock the connector at the home position. The drive assembly comprises a motor and a drive gear which rotatably connects with a drive pulley. The clutch mechanism is controlled by a solenoid. Upon energizing the solenoid, a clutch gear of the clutch mechanism separates from the drive gear so that the pulley drive gear is free to rotate and the cable is freely extendable.

A method of coiling and storing an electrical cable with a vehicle connector for EVSE preferably comprises providing a drum having a generally cylindrical sidewall with a generally vertical central axis and a top. The method further comprises automatically retracting the cable by downwardly driving the cable into the drum so that the coil engages against the sidewall to form a vertical coiled configuration and the connector is at a home position and allowing the cable and connector to be extended from the home position.

The method further preferably comprises automatically locking the cable and connector in an extended position and further automatically locking the cable connector in the home position.

BRIEF DESCRIPTION OF THE DRAWINGS

FIG. 1 is an isometric view of the EVSE assembly with motorized cable retracting capabilities, mounted on a pole;

FIG. 2 is an isometric view of the EVSE assembly with motorized cable retracting capabilities, mounted on a wall;

FIG. 3b is an isometric view of the EVSE front cover;

FIG. 3c is an isometric view of the EVSE connector pocket;

FIG. 3d is an isometric view of the EVSE top cover;

FIG. 6 is an exploded view of the motorized cable and various assemblies;

FIG. 7 is a top view of a cable centering guide ring and a storage cylinder;

DETAILED DESCRIPTION

Figure 3:
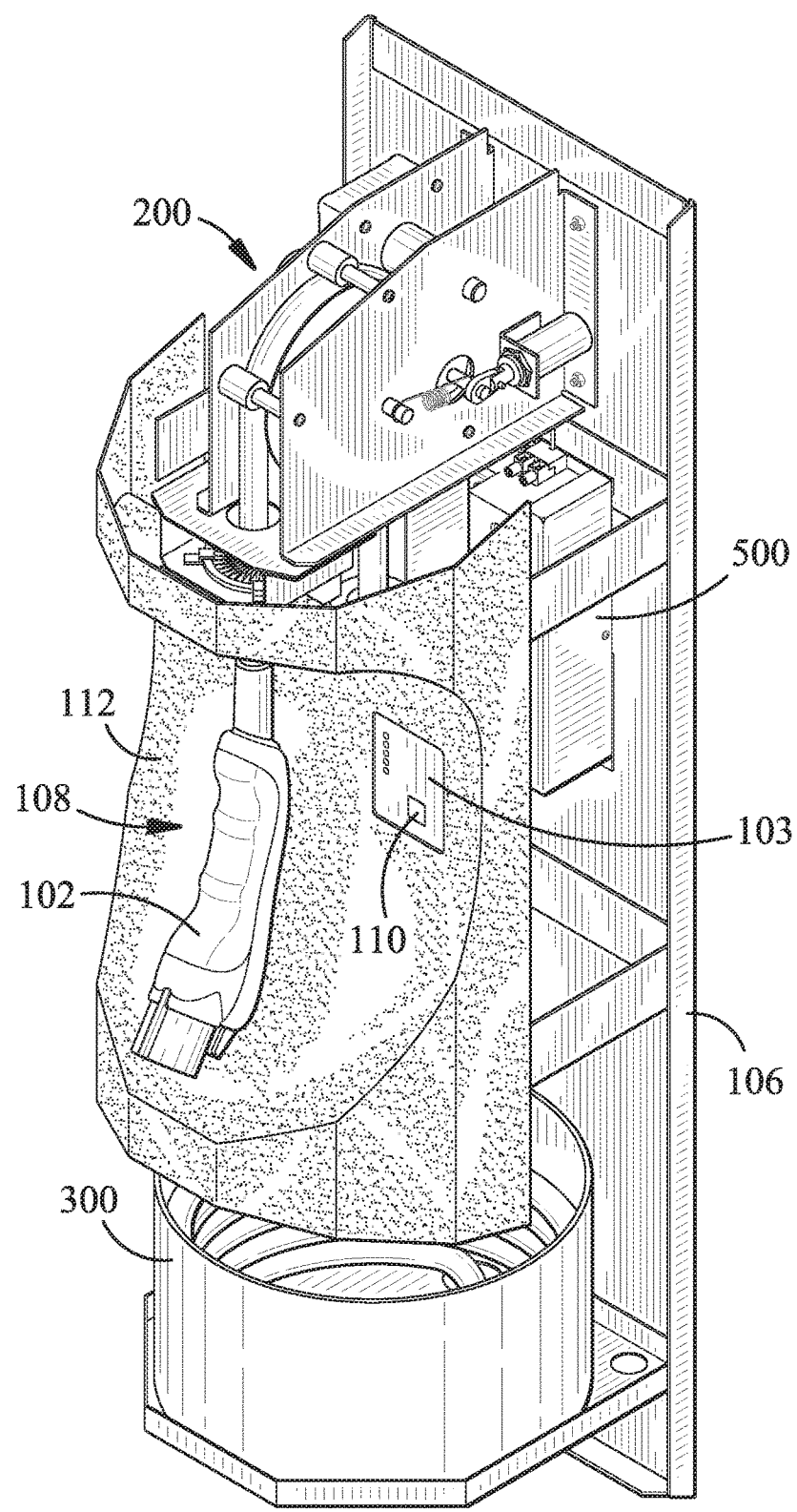
FIG. 3 is an isometric view of the EVSE assembly with motorized cable retracting capabilities, with the cover removed.
Figure 3A:
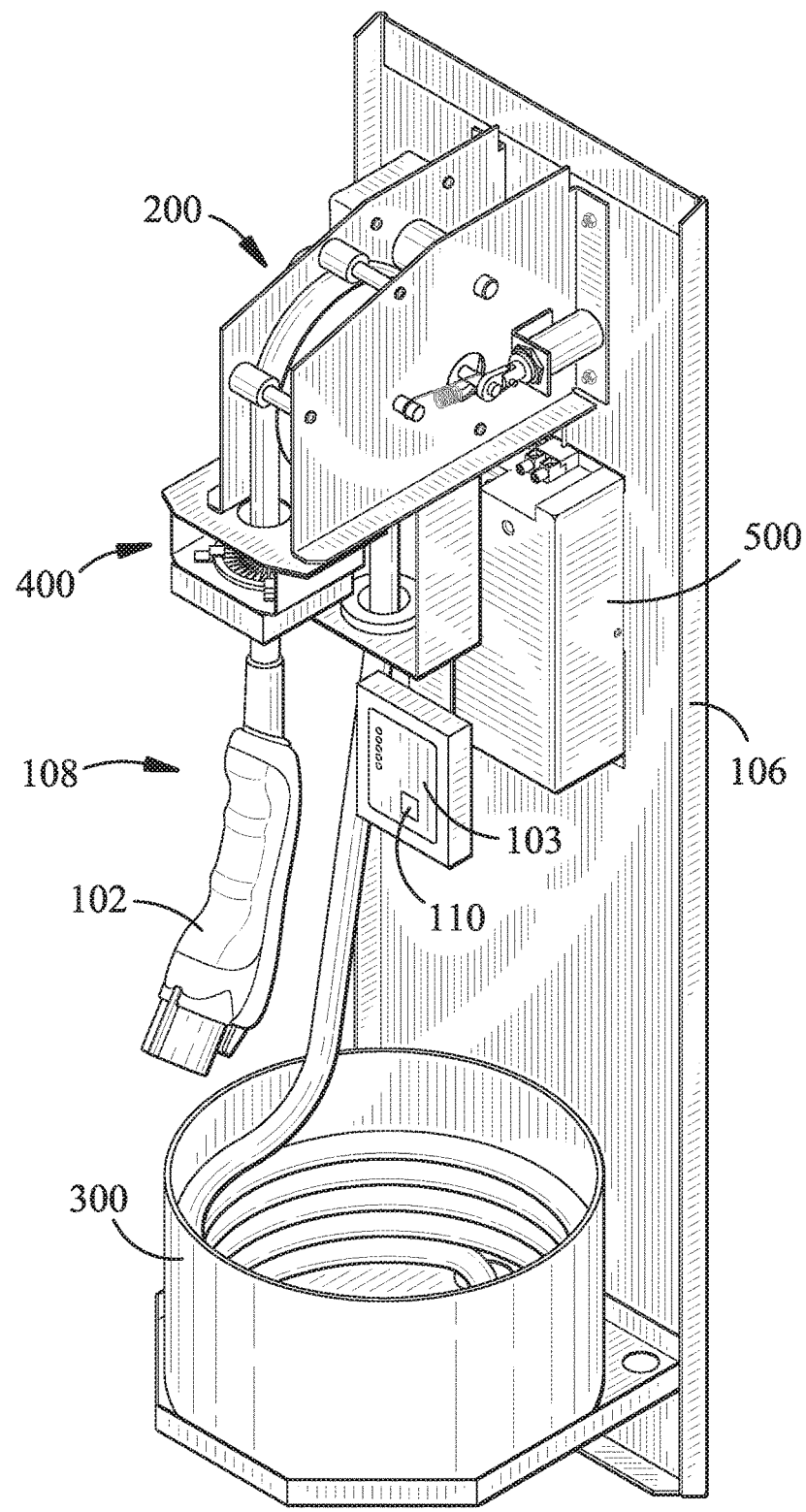
FIG. 3a is an isometric view of the EVSE assembly with motorized cable retracting capabilities, with the cover and connector pocket removed.

The electric vehicle service or supply equipment (EVSE) 100, which incorporates a motorized cable retraction system for coiling the cable, may be either mounted to a pole 104 (FIG. 1) or to a wall 109 (FIG. 2). EVSE 100 employs a motorized cable management system for coiling a power cable 101 having a connector 102 which preferably complies with J1772 standards.

EVSE 100 generally comprises five major sub-assemblies as follows:
  an enclosure, which includes a front cover 111, a mounting frame 106, and a power connector pocket panel 112;
  a cable drive pulley and clutch assembly 200, which comprises a cable drive motor 203, a drive motor gear box 202, a motor drive gear 204, a clutch lever 211, a clutch gear 205, a cable pulley drive gear 206, and a cable drive pulley 207;
  a cable storage assembly 300, which comprises a drum or a cable storage cylinder 301 and a mounting bracket 303;
  a cable guide and home position sensor assembly 400, which comprise cable guide rollers 401, a cable brush cleaner 402, a ring magnet 403, a magnetic sensor 405, and a magnetic sensor PC card 406; and
  an EVSE control and a ground-fault circuit interrupter (GFCI) module 500.

When the electric vehicle service equipment 100 is not in use, the EVSE power cable 101 is retracted until the EVSE power connector 102 is at the home position indicated by 108 (FIGS. 1 & 2).

When in the home position, the cable 101 is locked (indicated at 708a) and stored in the protective cable storage cylinder 300 (FIG. 3) (indicated at 709a).

Figure 4:
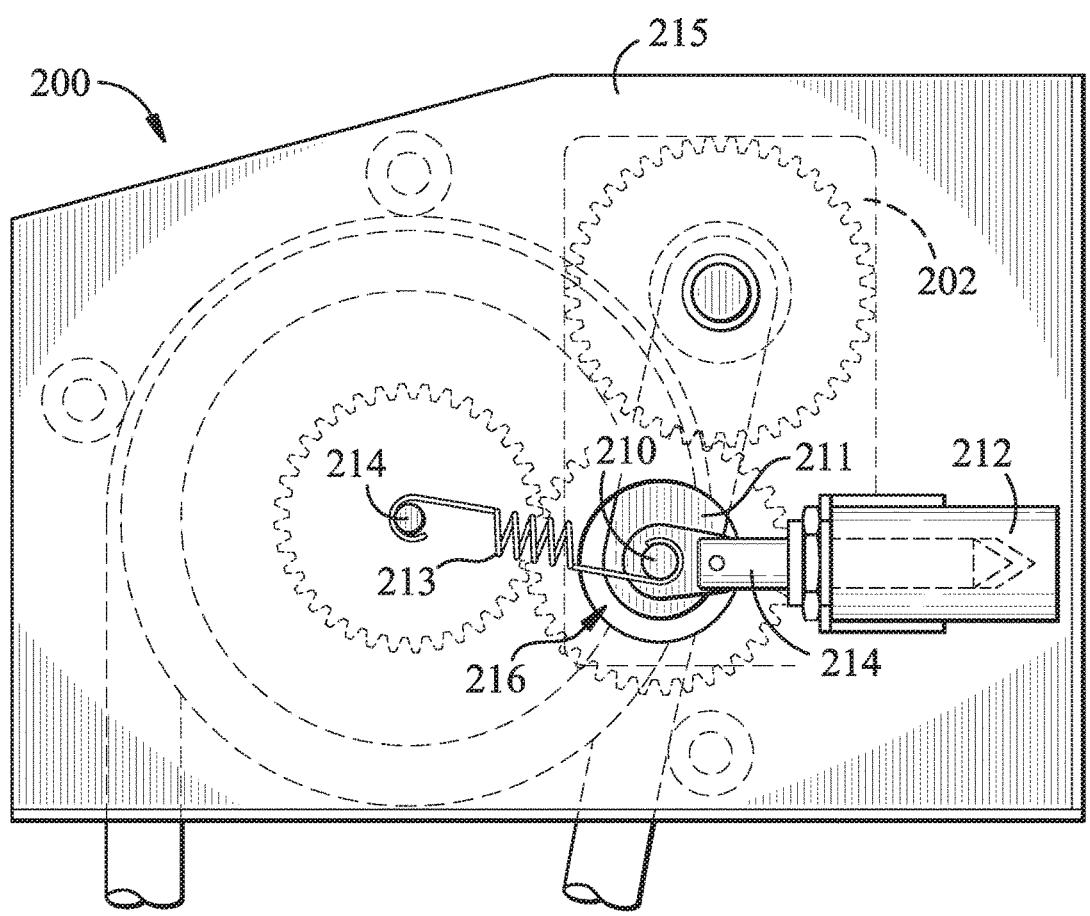
FIG. 4 is a side view of the motorized cable and a drive assembly with a solenoid clutch plate assembly.
Figure 4A:
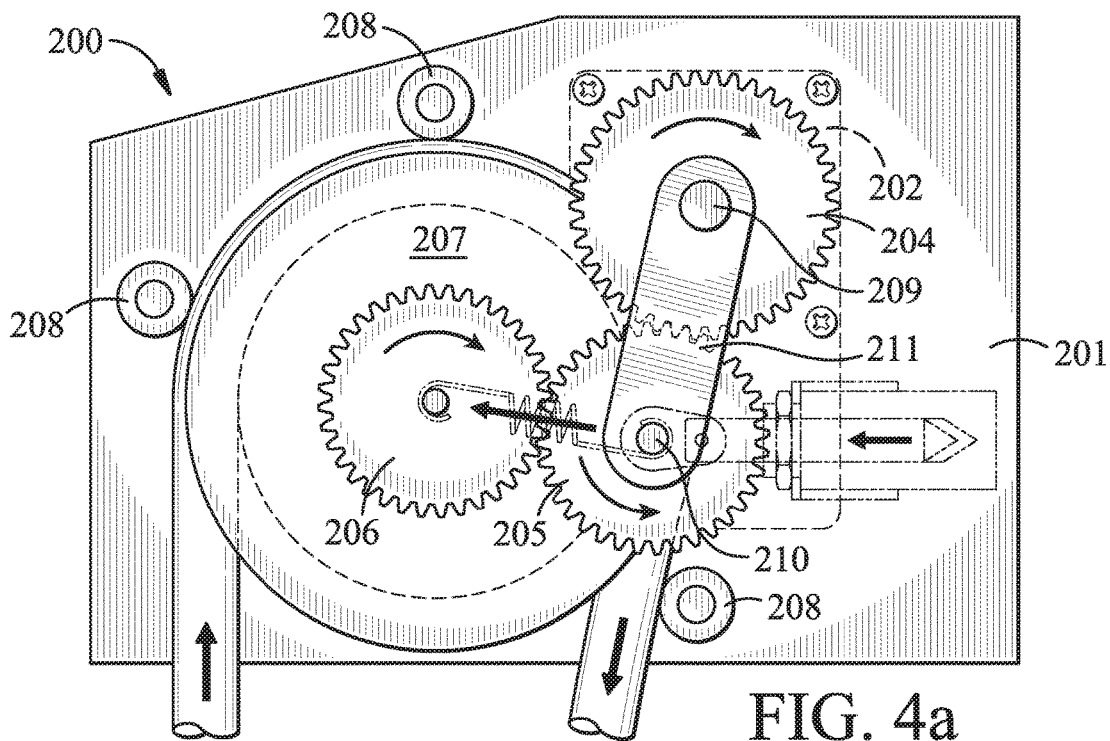
FIG. 4a is a side view of the cable and drive assembly of FIG. 4 with the clutch plate assembly removed and a clutch gear in an engaged position.
Figure 4B:
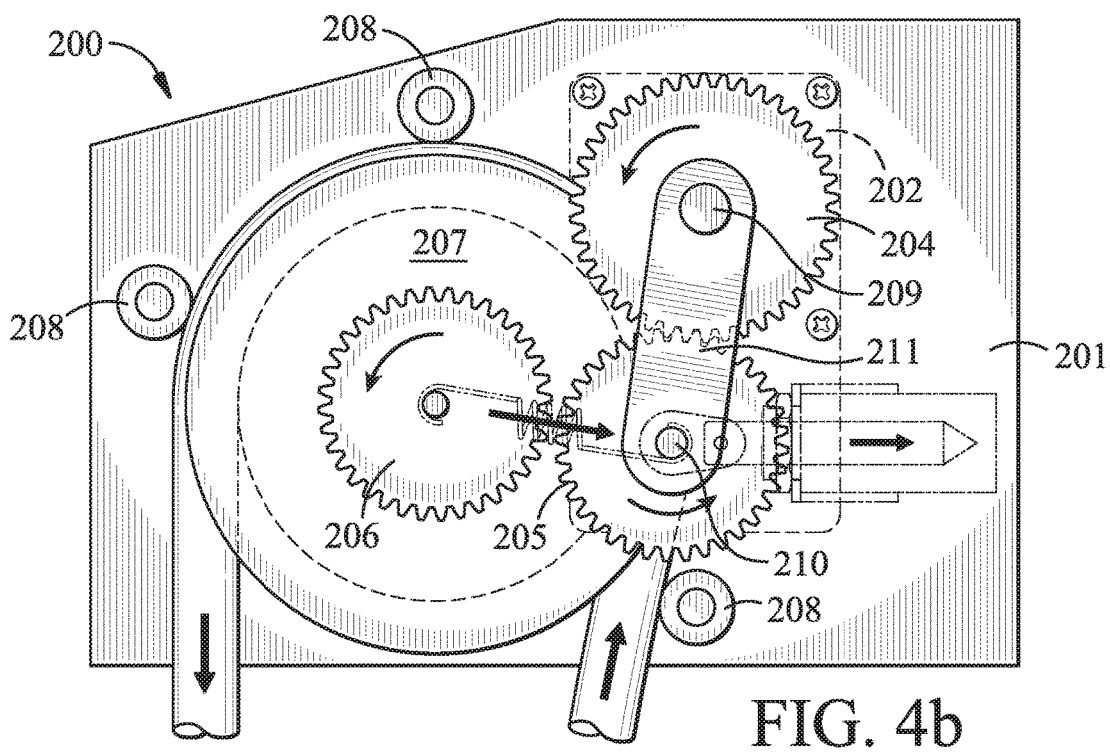
FIG. 4b is a side view of the cable and drive assembly of FIG. 4 with the clutch plate assembly removed and the clutch gear in a disengaged position.
Figure 5:
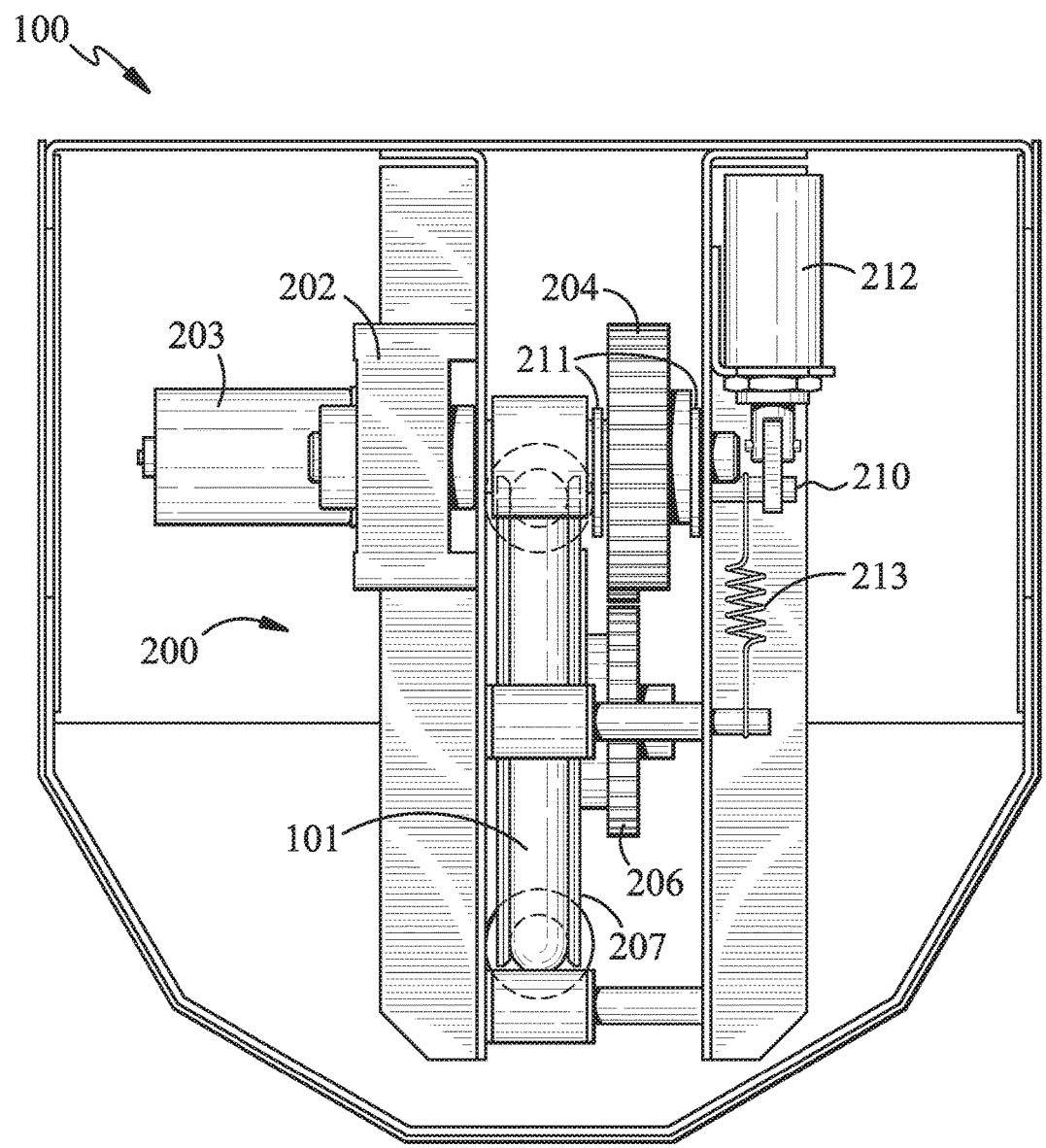
FIG. 5 is a top view of the motorized cable retracting drive assembly.
Figure 8:
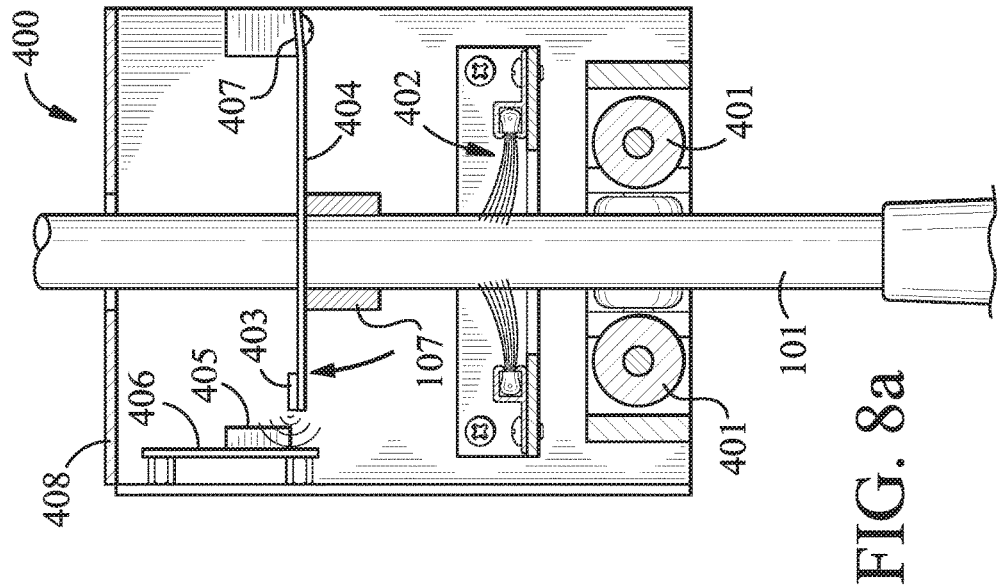
FIG. 8 is a side view, partly diagrammatic, of a cable cleaning and home sensing assembly with a magnet below the home position.
Figure 8A:
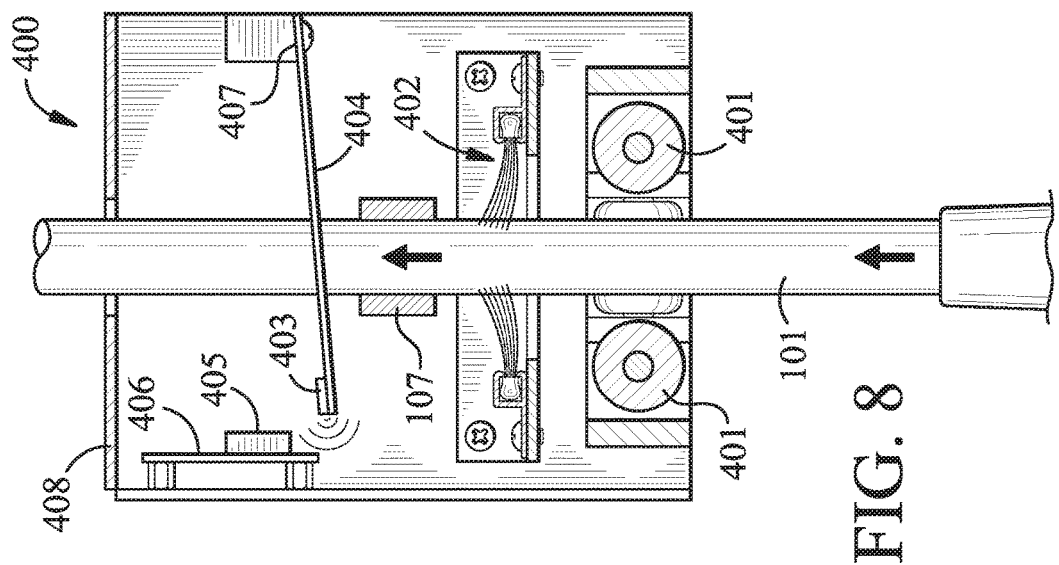
FIG. 8a is a side view of the cable cleaning and home sensing assembly of FIG. 8 with the magnet at the home position.
Figure 11:
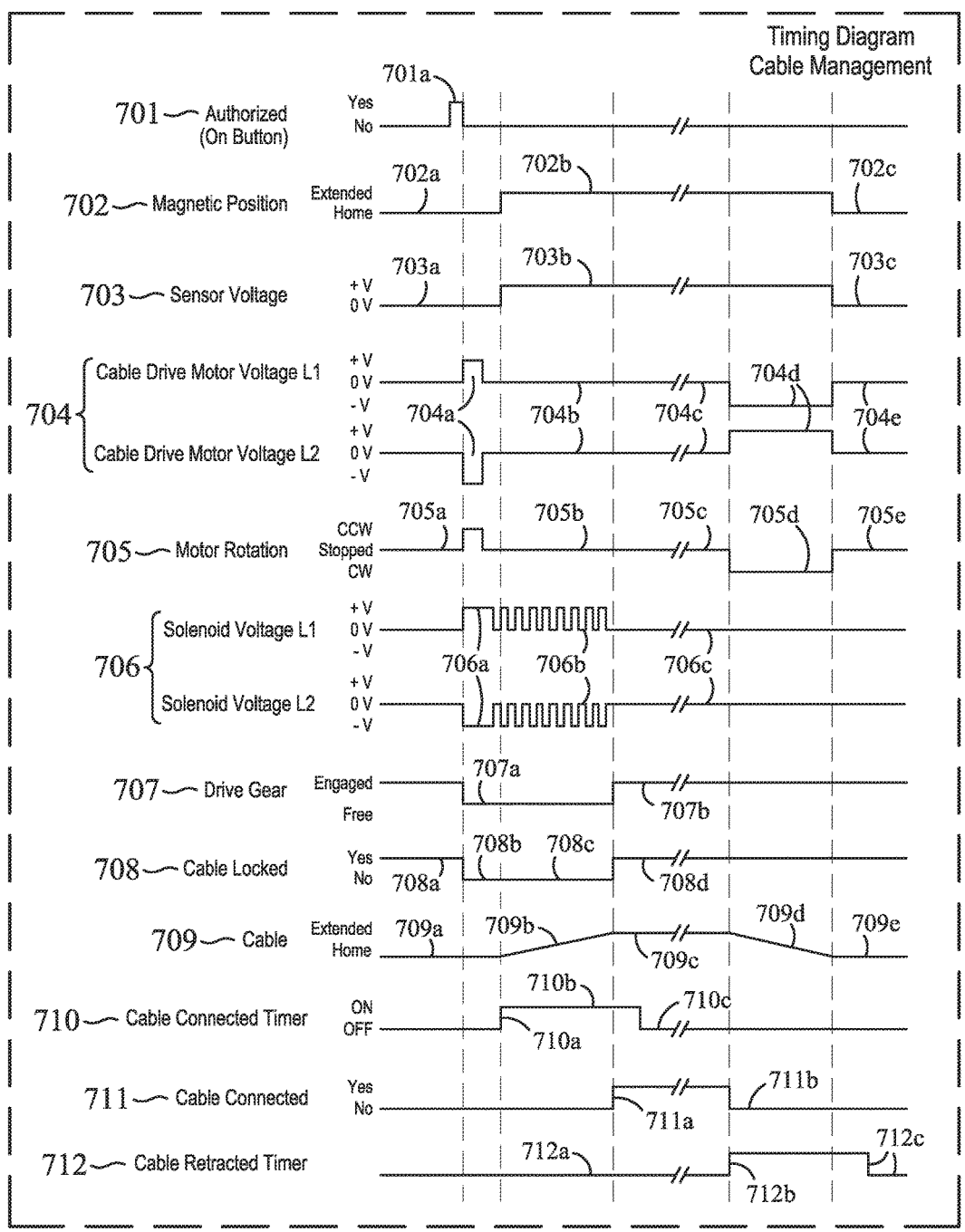
FIG. 11 is a timing diagram of the cable management motor drive system for the EVSE.

With additional reference to FIG. 11, when authorized (indicated at 701a) in the FIG. 11 timing diagram, a user presses the on button 110, on the control module and status indicator 103. The drive motor 203 is momentarily energized (indicated at 704a) with counterclockwise rotation (indicated at 705a), and the clutch solenoid 212 is energized (indicated at 706a). The clutch solenoid 212 is energized such that the clutch solenoid plunger 214 will be pulled into the clutch solenoid 212. The clutch solenoid plunger 214, which is operatively attached to the clutch lever 211, the clutch return spring 213, and the clutch gear shaft 210, will cause the clutch lever 211 to rotate around the clutch lever pivot post 208. With reference to FIG. 4b, this rotation separates the clutch gear 205 from the cable pulley drive gear 206 (indicated at 708a). Once the clutch gear 205 has separated from the cable pulley drive gear 206 (indicated at 708b), the voltage to the clutch solenoid is pulsed (indicated at 706b) to reduce the power and prevent the clutch solenoid 212 from overheating. To assist in the separation, the drive motor 203 is energized (indicated at 704) in the counterclockwise rotation direction for a short period of time.

Figure 9:
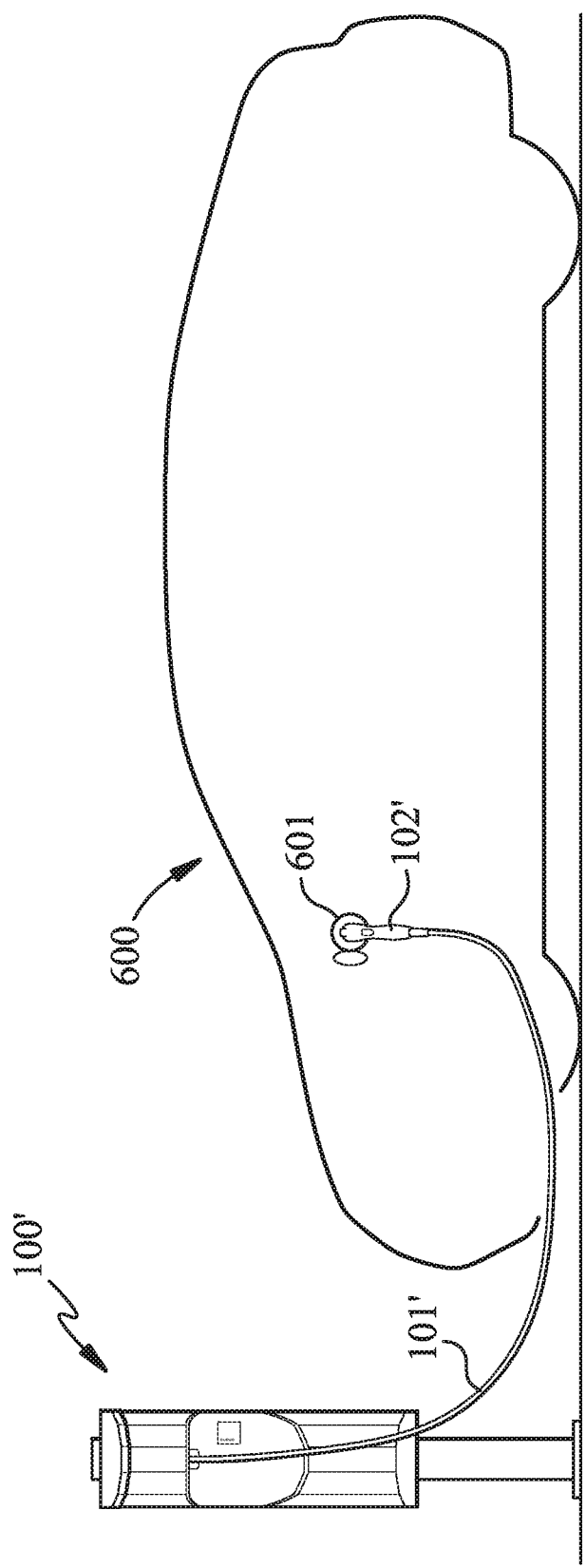
FIG. 9 is an elevational view of the EVSE and schematically illustrating a connection to an electric vehicle.
Figure 10:
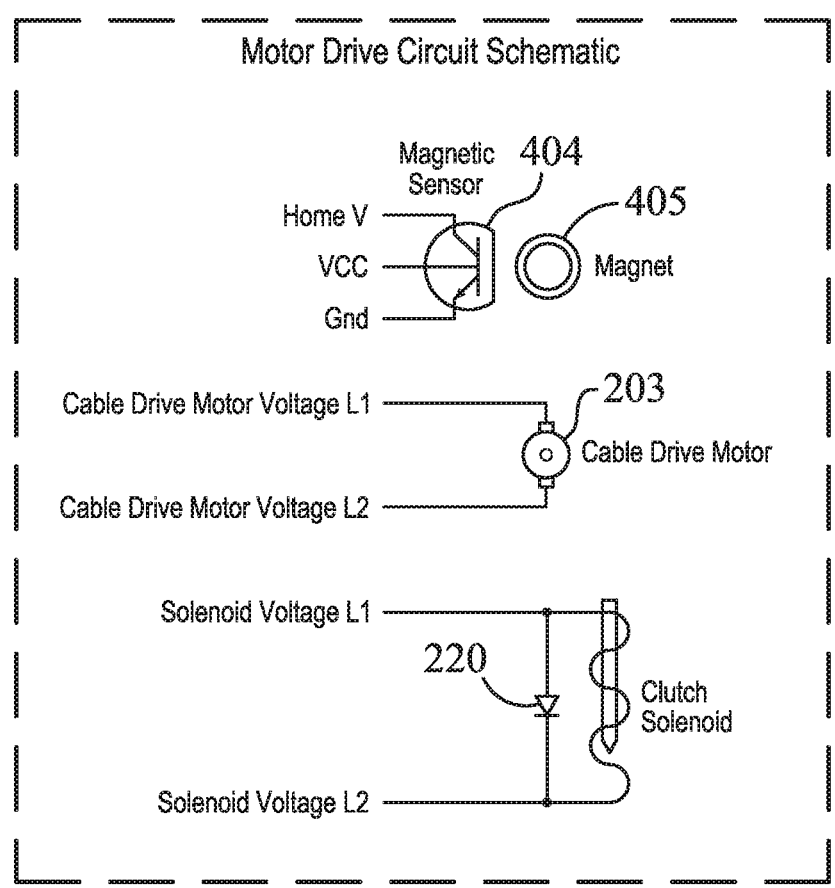
FIG. 10 is a composite schematic diagram of the cable management motor drive circuit for the EVSE.

The cable drive pulley 207 is free to rotate. The latter allows the user to simply extend (indicated at 709b) the EVSE power cable 101 until it reaches the electric vehicle power inlet 601 (indicated at 709c) on the electric vehicle 600 (FIG. 9). The EVSE power cable 101 may be extended from the cable storage cylinder 300 until it is restrained by the cable restraining bracket 303 (FIG. 6).

Once the EVSE power connector 102 is attached to the electric vehicle power inlet 601 and the charging cycle is initiated by the EVSE control and ground-fault circuit interrupter (GFCI) module 500, the clutch solenoid 212 is deactivated. The deactivation allows the clutch spring 213 attached to the clutch lever 211 and the clutch spring attachment post 214 to pull the clutch lever 211 and the clutch gear 205 to reengage with the cable pulley drive gear 206.

When the connection to the electric vehicle 600 is sensed (indicated at 711a) by the EVSE control and GFCI module 500, the clutch solenoid 212 will be de-energized (indicated at 706c), the clutch return spring 213 will cause the clutch lever 211 to re-engage the clutch gear 205 with the cable pulley drive gear 206 (indicated at 707b). Because the drive motor 203 is not energized (indicated at 704b), the cable drive pulley 207 is now locked, preventing the further extension (indicated at 709c) of the EVSE power cable 101 and the EVSE power connector 102.

When the power cable 101 is unlocked (indicated at 708b), the cable connected timer is started (indicated at 710a). If the cable connected timer times out (indicated at 710c) before the power connector 102 is connected to the electric vehicle 600 power inlet 601, the power cable 101 will be retracted (indicated at 709d) until it reaches the home position (indicated at 709e). When the power connector 102 reaches the home position 108, the power cable 101 will be locked in place (indicated at 708c).

When engaged, the cable drive pulley 207 will be in a locked position as long as the drive motor 203 is not powered. This will prevent the EVSE power cable 101 from being extended further. This locking feature is created by the fact that the drive motor gear box 202 is not easily driven in reverse.

When the EVSE power connector 102 is detached from the electric vehicle power inlet 601, the electrical power will be disconnected from the EVSE power connector 102 by the EVSE control and GFCI module 500. Power is applied to the cable drive motor 203 with a polarity that will cause it to drive in the clockwise direction (indicated at 704). The clockwise rotation of the cable pulley drive gear 206, which is attached to the cable drive pulley 207, will cause the retraction of the EVSE power cable 101.

As the EVSE power cable 101 enters the cable storage assembly 300 through the cable centering guide ring 218, it is forced against the cylinder wall 304, causing the cable to stack up 305 in a coiled configuration.

As the EVSE power cable 101 is returning to the home position, it will pass through the cable guide rollers 404 and the cable brush cleaner 402. As the cable home ring 107 reaches the home position (indicated at 702*c*), it will pick up the ring magnet 403 to the point that it passes the magnetic sensor 405. When the magnetic sensor 405 senses the ring magnet 403 (indicated at 703*c*), the sensor PC card 406 will send a signal (indicated at 703) to the EVSE control and GFCI module 500 to turn off the return drive motor 203 (indicated at 704*e*).

Because the clutch return spring 213 is keeping the clutch gear 205 engaged, the EVSE power cable 101 and the EVSE power connector 102 are locked in the home position 108.

The disclosed EVSE assembly stores the cable internally protected from the elements, while still presenting easy access to the power connector. When not in use the cable and connector are locked in position. The user may easily extend the charging cable between the electric vehicle and the EVSE unit while keeping the cable off of the ground. When the user disconnects the power connector from the vehicle, the cable is automatically retracted and stored internally in the EVSE, eliminating the tripping hazard. Preferably, the power connector hangs in a partly protected shell, four feet off of the ground and easily accessible.

The automatic system used for retracting and coiling the electrical cable does not use slip rings.

While preferred embodiments have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. An EVSE installation comprising:
   a drum having a cylindrical side wall with a generally vertical central axis and a top;
   an electrical cable with a vehicle connector at one end and connectable to a power supply at the other end and being retractable and extendable into and from said drum;
   a cable management system comprising a drive assembly for said electrical cable having a drive mode to retract said cable and a release mode to extend said cable, said cable management system comprising a clutch mechanism that remains locked when no power is applied;
   wherein said drive assembly drives said cable into said drum so that said cable progressively engages said side wall to form a vertical coiled configuration and said cable and connector are disposed at a stable home position.

2. The EVSE installation of claim 1 wherein said drum is supported on a pole or a wall.

3. The EVSE installation of claim 1 further comprising an enclosure for said drum with a front cover that mounts a control panel and receives the vehicle connector at the home position.

4. The EVSE installation of claim 1 wherein the drive assembly comprises a motor and a drive gear rotatably connecting with a drive pulley.

5. The EVSE installation of claim 4 wherein the cable management system comprises a clutch mechanism controlled by a clutch solenoid.

6. The EVSE installation of claim 5 wherein said cable management system comprises a clutch gear, a clutch lever and a spring attached to the clutch lever and upon de-energizing of the clutch solenoid, the clutch gear engages the drive gear.

7. The EVSE installation of claim 5 wherein after sensing connection of the vehicle connector to an electric vehicle, the solenoid and the motor are not energized, and the drive pulley is thereby locked to prevent further extension of said cable.

8. The EVSE installation of claim 5 wherein upon energizing said solenoid, the lever pivots and the clutch gear separates from the drive gear so that the pulley drive gear is free to rotate and the cable is freely extendable.

9. The EVSE installation of claim 1 wherein upon disconnecting the vehicle connector from the electric vehicle, the cable is automatically retracted into said drum by said drive assembly.

10. The EVSE installation of claim 1 further comprising a sensor that senses the home position of said cable and said connector.

11. The EVSE installation of claim 10 wherein said sensor is a magnetic sensor.

12. The EVSE installation of claim 1 further comprising a centering guide ring through which said cable passes.

13. The EVSE installation of claim 1 wherein the cable management system comprises a clutch mechanism and said drive assembly comprises a motor operatively engageable with said clutch mechanism and said clutch mechanism operatively engages with said motor to lock said connector at the home position.

14. An EVSE installation comprising:
   a drum defining a generally cylindrical container with a centering guide ring;
   an electrical cable with a vehicle connector at one end and connectable to a power supply at the other end and being retractable and extendable through said centering ring into and from said drum;
   a cable management system comprising a drive assembly for said electrical cable having a drive mode to automatically retract said cable and a release mode to allow said cable to extend from said drum and comprising a clutch mechanism, said drive assembly comprising a motor operatively engageable with said clutch mechanism;
   wherein said drive assembly automatically drives said cable into said drum so that said cable progressively engages said container to form a coiled configuration and said clutch mechanism is operatively engageable with said motor to lock said cable and connector at a stable home position.

15. The EVSE installation of claim 14 wherein the motorized cable management system comprises a clutch mechanism that remains locked when no power is applied.

16. The EVSE installation of claim 14 wherein the drive assembly comprises a drive gear rotatably connecting with a drive pulley, and the clutch mechanism is controlled by a clutch solenoid and the clutch mechanism comprises a clutch gear and a biased clutch lever, and upon de-energizing the clutch solenoid, the clutch gear engages the drive gear.

17. The EVSE installation of claim 16 wherein upon energizing said solenoid, the lever pivots and the clutch gear separates from the drive gear so that the pulley drive gear is free to rotate and the cable is freely extendable.

18. A method of coiling and storing an electrical cable with a vehicle connector for EVSE comprising:
   providing a drum having a generally cylindrical side wall with a generally vertical central axis and a top;
   automatically retracting said cable by downwardly driving the cable into said drum so that said coil serially engages against said side wall to form a vertical coiled configuration and said connector is at a home position;
   allowing said cable and connector to be extended from said home position; and
   automatically locking said cable and connector in an extended position.

19. The method of claim 18 further comprising automatically locking said cable and connector in the home position.

20. A method of coiling and storing an electrical cable with a vehicle connector for EVSE comprising:
   providing a drum having a generally cylindrical side wall with a generally vertical central axis and a top;
   automatically retracting said cable by downwardly driving the cable into said drum so that said coil serially engages against said side wall to form a vertical coiled configuration and said connector is at a home position;
   allowing said cable and connector to be extended from said home position; and
   automatically locking said cable and connector in the home position.

21. An EVSE installation comprising:
   a drum defining a generally cylindrical container;
   an electrical cable with a vehicle connector at one end and connectable to a power supply at the other end and being retractable and extendable into and from said drum;
   a cable management system comprising a drive assembly for said electrical cable having a drive mode to automatically retract said cable and a release mode to allow said cable to extend from said drum and comprising a clutch mechanism that remains locked when no power is applied;
   wherein said drive assembly automatically drives said cable into said drum so that said cable progressively engages said container to form a coiled configuration and said cable and connector are disposed at a stable home position.

* * * * *